(12) United States Patent
Yano

(10) Patent No.: US 8,219,527 B2
(45) Date of Patent: Jul. 10, 2012

(54) FILE PROCESSING APPARATUS, FILE PROCESSING METHOD, AND COMPUTER PROGRAM PRODUCT

(75) Inventor: Keijiro Yano, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/039,620

(22) Filed: Mar. 3, 2011

(65) Prior Publication Data

US 2011/0307532 A1 Dec. 15, 2011

(30) Foreign Application Priority Data

Jun. 15, 2010 (JP) .................................. 2010-136410

(51) Int. Cl.
*G06F 7/00* (2006.01)
*G06F 17/00* (2006.01)
(52) U.S. Cl. ....................................... 707/613; 707/623
(58) Field of Classification Search ........................ None
See application file for complete search history.

(56) References Cited

U.S. PATENT DOCUMENTS

| | | | | |
|---|---|---|---|---|
| 6,578,054 | B1 * | 6/2003 | Hopmann et al. | 707/625 |
| 7,047,240 | B2 | 5/2006 | Sato | |
| 7,711,771 | B2 * | 5/2010 | Kirnos | 709/203 |
| 7,827,138 | B2 * | 11/2010 | Salmon et al. | 707/610 |
| 2002/0065999 | A1 | 5/2002 | Kikuchi et al. | |
| 2003/0182329 | A1 | 9/2003 | Sato | |
| 2006/0112100 | A1 | 5/2006 | Maeda et al. | |
| 2006/0174054 | A1 | 8/2006 | Matsuki | |
| 2011/0295806 | A1 * | 12/2011 | Erofeev | 707/634 |

FOREIGN PATENT DOCUMENTS

| | | |
|---|---|---|
| JP | 06-231026 | 8/1994 |
| JP | 2000-082004 | 3/2000 |
| JP | 2003-271431 | 9/2003 |
| JP | 2003-280965 | 10/2003 |
| JP | 3527756 | 2/2004 |
| JP | 2006-154940 | 6/2006 |
| JP | 2006-209662 | 8/2006 |

OTHER PUBLICATIONS

Dong et al., "RFS: a network file system for mobile devices and the cloud", Newsletter, ACM SIGOPS Operating Systems Review, vol. 45, Issue 1, 2011, ACM.*

Notice of Rejection mailed by the Japan Patent Office on May 31, 2011 in the corresponding Japanese app. No. 2010-136410 in 4 pages.

* cited by examiner

*Primary Examiner* — Michael Hicks
(74) *Attorney, Agent, or Firm* — Knobbe, Martens, Olson & Bear LLP

(57) ABSTRACT

According to one embodiment, a file processing apparatus includes an acquisition module, a change module, an association storage module, a receiver, a creator, a call module, a determination module, a file determination module, and an output module. The acquisition module acquires a first file having a first file name. The change module changes the first file name to a second file name. The association storage module stores the file names. The receiver receives a selection of the first file name. The creator creates a second file assigned the first file name. The call module calls an application capable of editing the second file. The determination module determines whether the name of the second file can be changed. When the file name can be changed, the file determination module determines whether a difference exists between the first and second files. When a difference exists, the output module outputs the second file.

5 Claims, 5 Drawing Sheets

| PRE-CHANGE FILE NAME | POST-CHANGE FILE NAME |
|---|---|
| a. xxx | 0001. 0001 |
| b. xxx | 0001. 0002 |
| c. yyy | 0001. 0003 |
| ⋮ | ⋮ |

FILE PROCESSING APPARATUS, FILE PROCESSING METHOD, AND COMPUTER PROGRAM PRODUCT

CROSS-REFERENCE TO RELATED APPLICATIONS

This application is based upon and claims the benefit of priority from Japanese Patent Application No. 2010-136410, filed Jun. 15, 2010, the entire contents of which are incorporated herein by reference.

FIELD

Embodiments described herein relate generally to a file processing apparatus, a file processing method, and a computer program product.

BACKGROUND

There have been proposed various types of technologies for managing a file in a computer system.

For example, Japanese Patent Application Publication (KOKAI) No. 2003-271431 discloses a conventional technology for managing a file. According to the conventional technology, a file name is created based on a word input by the user to manage a file with the file name. Since the file name is created based on the input word, the user can easily specify the file using the file name as a search keyword.

There has been a tendency to manage a file in a plurality of places. For example, a file created by a computer may be stored in an external hard disk for backup purposes. In recent years, cloud computing has been proposed as a service to use a computer. Accordingly, there is a demand for matching a file in a local computer to a file managed in the cloud.

In a file management system in such circumstances, it is important when the same files in a plurality of places are matched. A conventional technology has been proposed to match the same files. With the conventional technology, upon detecting a file updated in one storage device, the update is reflected in another storage device, a computer, a service, or the like.

According to the conventional technologies, while the user is editing a file, the matching process is performed each time the user saves the file, resulting in a heavy processing load. Especially, in the former conventional technology, only an appropriate file name is created to manage a file, and it is not taken into account to manage the same files in a plurality of places.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a file processing apparatus comprises an acquisition module, a change module, an association storage module, a receiver, a creator, a call module, a determination module, a file determination module, and an output module. The acquisition module is configured to acquire a first file. The change module is configured to change a first file name of the first file to a second file name that is automatically created regardless of the first file name. The association storage module is configured to store the first file name and the second file name in association with each other. The receiver is configured to receive a selection of the first file name. The creator is configured to copy the first file specified with reference to the first file name selected through the receiver and the association storage module, and create a second file assigned the first file name. The call module is configured to call an application capable of editing the second file and feed the application with the second file. The determination module is configured to determine whether the file name of the second file opened by the application can be changed. The file determination module is configured to, when the file name can be changed, determine whether there is a difference between the first file and the second file. The output module is configured to, when there is a difference, output the second file.

According to another embodiment, there is provided a file processing method applied to a file processing apparatus. The file processing method comprises: acquiring a first file by an acquisition module; changing, by a change module, a first file name of the first file to a second file name that is automatically created regardless of the first file name; storing the first file name and the second file name in association with each other in an association storage module; receiving a selection of the first file name by a receiver; copying the first file specified with reference to the first file name selected at the receiving and the association storage module, and creating a second file assigned the first file name by a creator; calling an application capable of editing the second file and feeding the application with the second file by a call module; determining, by a determination module, whether the file name of the second file opened by the application can be changed; determining, when the file name can be changed, whether there is a difference between the first file and the second file by a file determination module; and outputting, when there is a difference, the second file by an output module.

According to still another embodiment, a computer program product comprises a computer usable medium having computer readable program codes embodied in the medium that, when executed, causes a computer to implement the above file processing apparatus.

Figure 1:
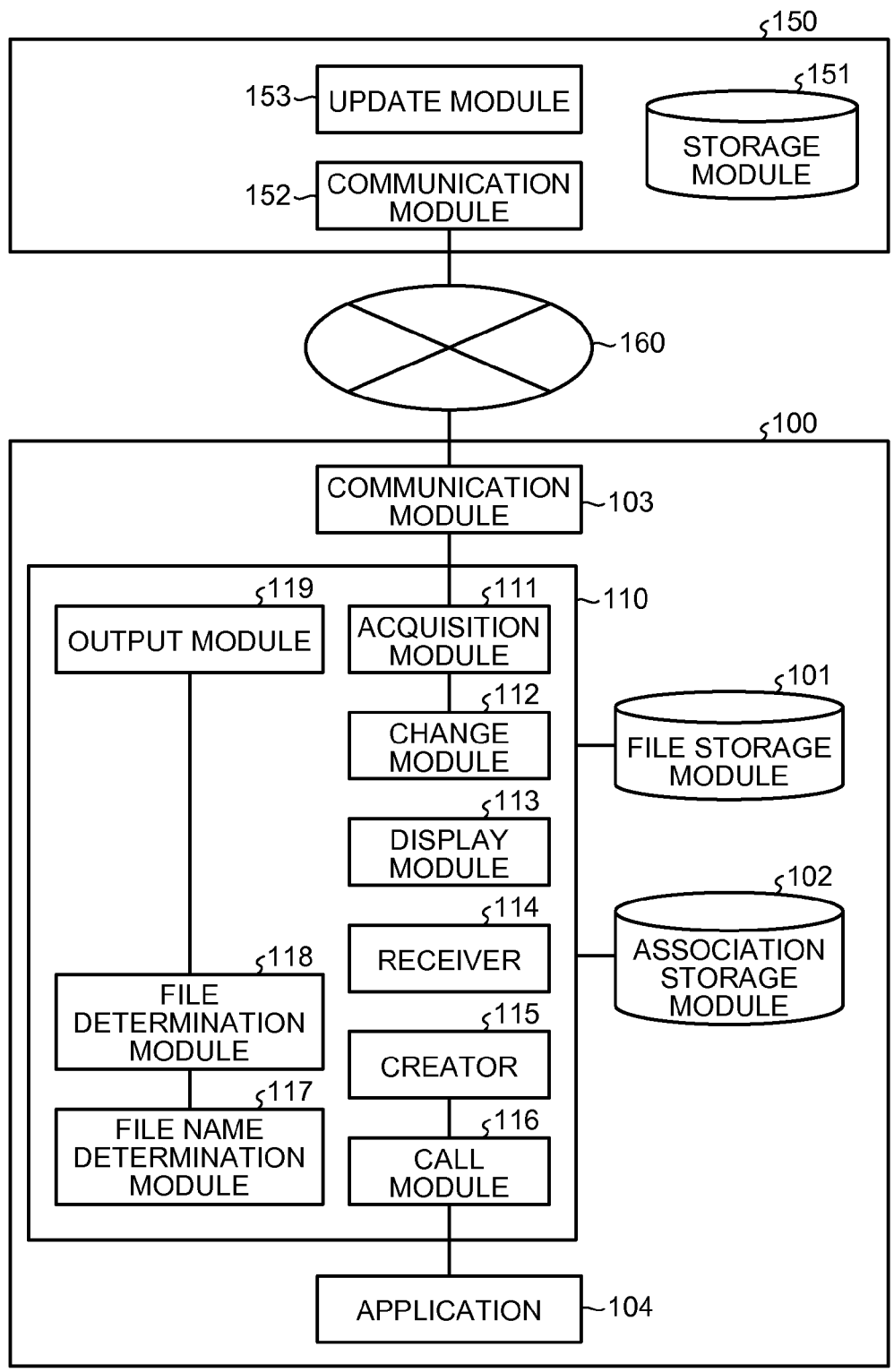
FIG. 1 is an exemplary block diagram of a file management system according to an embodiment.

FIG. 1 is a block diagram of a file management system according to an embodiment. As illustrated in FIG. 1, the file management system comprises a server 150 and a personal computer (PC) 100.

In the file management system of the embodiment, the server 150 manages files, and exchanges each of the files with each of PCs connected thereto via a network. With this, the PCs can use the files managed by the server 150.

The server 150 comprises a storage module 151, a communication module 152, and an update module 153.

The storage module 151 manages files that can be used by PCs connected via the network to the server 150.

The communication module 152 communicates with the PCs connected via the network to the server 150. For example, the communication module 152 transmits a file stored in the storage module 151 to the PC 100 and receives a file to be stored in the storage module 151 from the PC 100.

The update module 153 updates a file stored in the storage module 151. For example, the update module 153 updates a file stored in the storage module 151 with a file received by the communication module 152 from the PC 100.

With the above configuration, the server 150 provides a file stored in the storage module 151 to a PC connected thereto via a network 160, and updates the storage module 151 with a file edited by the PC. In the following, a description will be given of the PC 100 that uses a file.

The PC 100 comprises a file storage module 101, an association storage module 102, a communication module 103, an application 104, and a file management application 110.

The communication module 103 communicates with the server 150 connected thereto via the network 160. For example, the communication module 103 transmits/receives a file to/from the server 150. The file storage module 101 stores the file.

The file management application 110 comprises an acquisition module 111, a change module 112, a display module 113, a receiver 114, a creator 115, a call module 116, a file name determination module 117, a file determination module 118, and an output module 119.

In the embodiment, the file management application 110 manages files received from the server 150 all together. In the following, a description will be given of the operation of the file management system using the file management application 110.

Figures 2, 3:
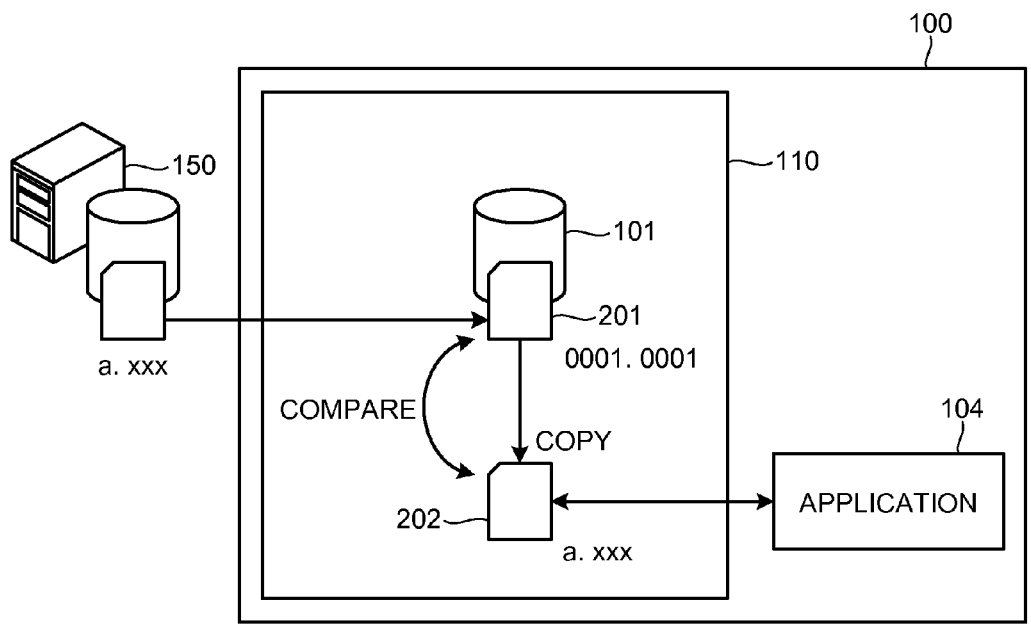
FIG. 2 is an exemplary schematic diagram of the file management system in the embodiment.
FIG. 3 is an exemplary schematic diagram of the structure of a table stored in an association storage module in the embodiment.

FIG. 2 illustrates the file management system of the embodiment. As illustrated in FIG. 2, the server 150 manages a file (for example, "a. xxx"). Incidentally, "xxx" is an extension. The file managed by the server 150 is provided to the PC 100 via the network 160. In the embodiment, the server 150 sends the PC 100 all files that can be used by the PC 100.

In this manner, the server 150 provides a file stored therein to the PC 100 to be locally stored. This eliminates the need that the PC 100 communicates with the server 150 when the user refers to the file, thereby improving the quick response capability.

The file management application 110 of the PC 100 changes the file names of all files provided form the server 150, and then stores the files in the file storage module 101. For example, the file management application 110 changes the file names to names automatically and uniquely assigned to the files. In the example of FIG. 2, the file name "a. xxx" is changed to "0001.0001". In this manner, the file name is changed to prevent a file provided from the server 150 and stored in the file storage module 101 from being accidentally edited outside the control of the file management application 110.

Upon receipt of an instruction to open a file, the file management application 110 creates a copy file (e.g., a copy file 202) of a file stored in the file storage module 101 (e.g., a backup file 201 with the file name "0001.0001") and assigns the original file name (e.g., "a. xxx") to the copy file. The file management application 110 calls an application which can use the file, and feeds the application with the file having the original file name (e.g., the copy file 202).

After that, the file management application 110 checks whether the file name of the file (e.g., the copy file 202) fed to the application can be changed at regular time intervals. Depending on whether the file name can be changed, the file management application 110 determines whether the file is open such that it can be edited by the application 104. That is, the file management application 110 determines that the file is being edited when the file name cannot be changed, while the file management application 110 determines that the file has been edited when the file name can be changed. This determination is made using the mechanism in which when an application provided by the operating system (not illustrated) on the PC 100 is open and is capable of editing a file, the file name of the file cannot be changed. Incidentally, the point is whether the file name can be changed, and the file name need not actually be changed.

After checking that the file name can be changed, the file management application 110 compares the file fed to the application 104 (e.g., the copy file 202) with the copy source file stored in the file storage module 101 (e.g., the backup file 201). If there is no difference between the files, it means that the file has not been edited. Accordingly, the file management application 110 deletes the file fed to the application 104 (e.g., the copy file 202), and does not perform the process of, for example, transmitting the file to the server 150 and the like.

On the other hand, if there is a difference between the files, the file management application 110 determines that the file has been edited. Accordingly, the file management application 110 overwrites the copy source file stored in the file storage module 101 (e.g., the backup file 201) with the file fed to the application 104 (e.g., the copy file 202), and then updates the file stored in the server 150.

As described above, according to the embodiment, the file management application 110 determines whether the first application completes editing a file.

There is a conventional technology in which when updated, a file is transferred to a server. With the conventional technology, each time the user saves a file while an application is editing the file, the file is updated. As a result, the server 150 is updated a number of times during a single editing task, which increases processing load on the PC 100 and load on the network 160. On the other hand, in the embodiment, it can be easily detected whether an application completes editing a file without load on the PC 100. In addition, the number of times of updating is reduced, which reduces load on the PC 100 and the network 160. Referring back to FIG. 1, the configuration of the PC 100 will be described.

The acquisition module 111 acquires all files that can be fed to the PC 100 from the storage module 151 of the server 150 via the communication module 103. The acquisition module 111 then stores all the acquired files in the file storage module 101.

The change module 112 changes the original file names (pre-change file names) of all the files acquired by the acquisition module 111 and stored in the file storage module 101. The changed file names (post-change file names) are not recognized by the user as the names of the files. The post-change file name does not contain a character string of the pre-change file name, and is automatically and uniquely created regardless of the pre-change file name with respect to each file. By changing the file name of a file, the user is prevented from using the file as recognizing the pre-change file name. Besides, the extension of the post-change file name differs from that of the pre-change file name. This prevents the activation of an application that changes the file. The change module 112 stores the association between the pre-change file name and the post-change file name in the association storage module 102.

The association storage module 102 can be read and written by the file management application 110. The association storage module 102 stores the association between the pre-change file name and the post-change file name. FIG. 3 illustrates an example of the structure of a table stored in the association storage module 102. As illustrated in FIG. 3, the association storage module 102 stores the pre-change file name in association with the post-change file name. This enables each module of the file management application 110 to specify the post-change file name based on the pre-change file name or specify the pre-change file name based on the post-change file name by referring to the association storage module 102.

Figure 4:
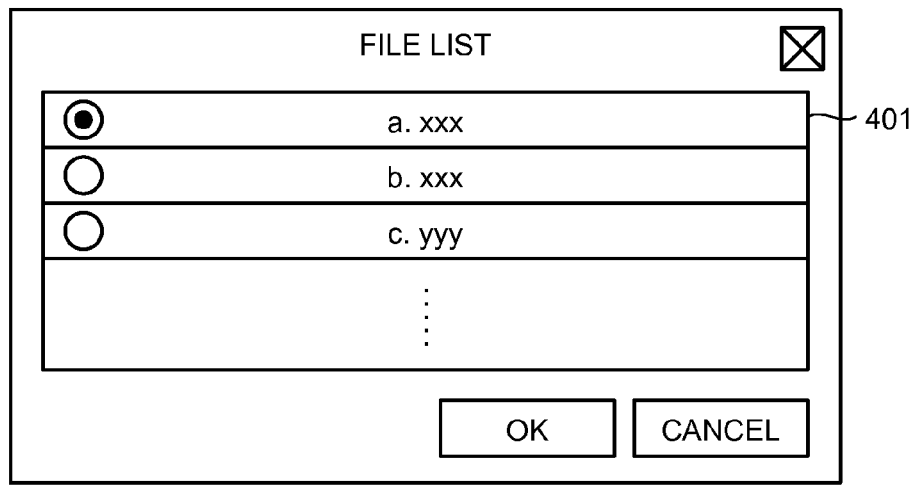
FIG. 4 is an exemplary schematic diagram of a file selection screen displayed on a display module in the embodiment.

The display module 113 displays a list of the pre-change file names of files managed by the file management application 110 on a file selection screen. FIG. 4 illustrates an example of the file selection screen displayed on the display module 113. As illustrated in FIG. 4, the display module 113 displays a list of the pre-change file names stored in the association storage module 102 in a list display field 401. This allows the user to check available files and select a desired file from the list display field 401 on the file selection screen.

Figure 5:
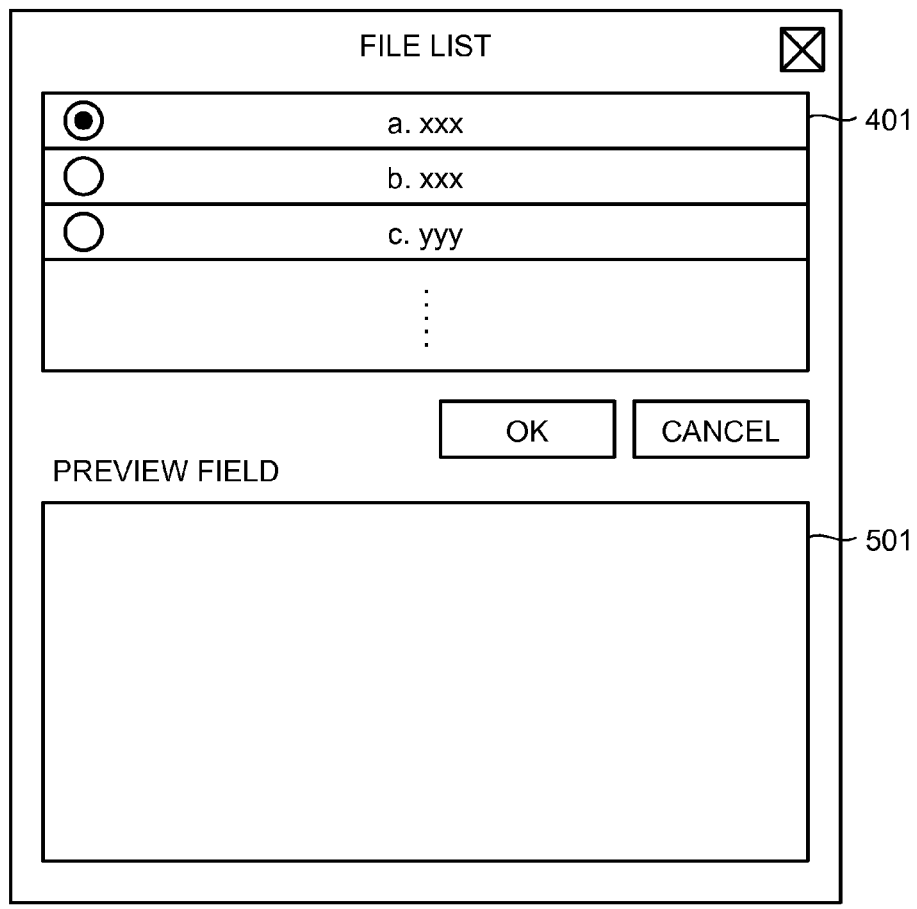
FIG. 5 is an exemplary schematic diagram of another file selection screen displayed on the display module in the embodiment.

The display module 113 may display other types of the file selection screen than the one as illustrated in FIG. 4. FIG. 5 illustrates another example of the file selection screen displayed on the display module 113. In the example of FIG. 5, the file selection screen contains a preview field 501 to display the content of a selected file in addition to the file name list. As illustrated in FIG. 5, by displaying the content of a file in the preview field 501, the user can easily specify a file that he/she wishes to use. In this case also, all files are acquired from the server 150 and stored in the file storage module 101. This eliminates the need to acquire a file from the server 150 to display the preview. Thus, the display module 113 can promptly display the content of the file.

Referring back to FIG. 1, the receiver 114 receives the selection of a pre-change file name from the file selection screen. The selection of a file need not necessarily be received through the file selection screen, and may be received in any other manner.

When the receiver 114 receives the selection of a file name, the creator 115 copies a file specified by the selected pre-change file name and a post-change file name associated with the pre-change file name in the association storage module 102. The creator 115 then assigns the selected pre-change file name to the file to create a copy file.

The call module 116 calls an application capable of editing the created copy file and feeds the application with the copy file. In the embodiment, for example, the application 104 is called as an application capable of editing the copy file. The call module 116 can call various applications associated with the extension of the pre-change file name.

The file name determination module 117 determines whether the file name of the copy file opened by the application 104 can be changed at a predetermined time interval. The predetermined time interval is set to an appropriate value depending on the user's specification of the file format. For example, the file name determination module 117 makes the determination every several tens of minutes. Having determined that the file name can be changed, the file name determination module 117 determines that the application 104 completes editing the copy file. On the other hand, having determined that the file name cannot be changed, the file name determination module 117 determines that the application 104 is editing the copy file. This determination is made using the mechanism in which when an application provided by the OS running on the PC 100 is open and is capable of editing a file, the file name of the file cannot be changed.

When the file name determination module 117 determines that the file name can be changed, the file determination module 118 determines whether the copy file fed to the application 104 is different from the copy source file. The determination on the difference between the files may be made by any method including known ones. For example, the file name determination module 117 determines whether the files are the same based on their sizes.

When the file determination module 118 determines that the files are different from each other, the output module 119 transmits the changed copy file to the server 150 via the communication module 103 together with an update request. Besides, when the file determination module 118 determines that the files are different from each other, the output module 119 assigns a post-change file name to the changed copy file, and updates the file stored in the file storage module 101.

With the configuration described above, the file management application 110 manages files received from the server 150 all together. When a file is updated, the file is transmitted to the server 150 after completion of editing the file.

Besides, the file management application 110 copies a new file that can be edited by various types of applications and pastes the copy on the setting screen, thereby registering the file in the server 150. The master of the file copied and pasted is managed by the server 150, and can be used through the file management application 110.

With the configuration described above, the file management application 110 provides the function of sharing a file among a plurality of PCs or users through the server 150. By detecting that a managed file has been edited with a low load, the file management application 110 can maintain the processing performance.

The application 104 is an example of an application that can use a file managed by the file management application 110.

Files to be managed by the file management application 110 may be of any type. Examples of the files include a document file, an image file, a spreadsheet file, and a presentation file.

The access from the file management application 110 to the storage area of the storage module 151 on the server 150 depends on the network speed. Therefore, compared to the case of accessing the local storage (built-in hard disk drive (HDD), etc.) such as the file storage module 101 or the like of the PC 100, the access speed is low. In view of this, according to the embodiment, the file management application 110 stores a file from the server 150 in the file storage module 101 on the local storage to manage it. In this case, there may exist a plurality of the same files. If the files are shared among a plurality of users, competition may occur.

For this reason, the file management application 110 exchanges the condition of the file management application with other PCs via the server 150. If competition occurs with another PC, the file management application 110 detects occurrence of the competition and notifies the user of it. When the call module 116 feed a file to the application 104, the file management application 110 notifies the server 150 of it. When the filename determination module 117 detects that a file has been edited, the file management application 110 notifies the server 150 of the completion of editing the file.

Figure 6:
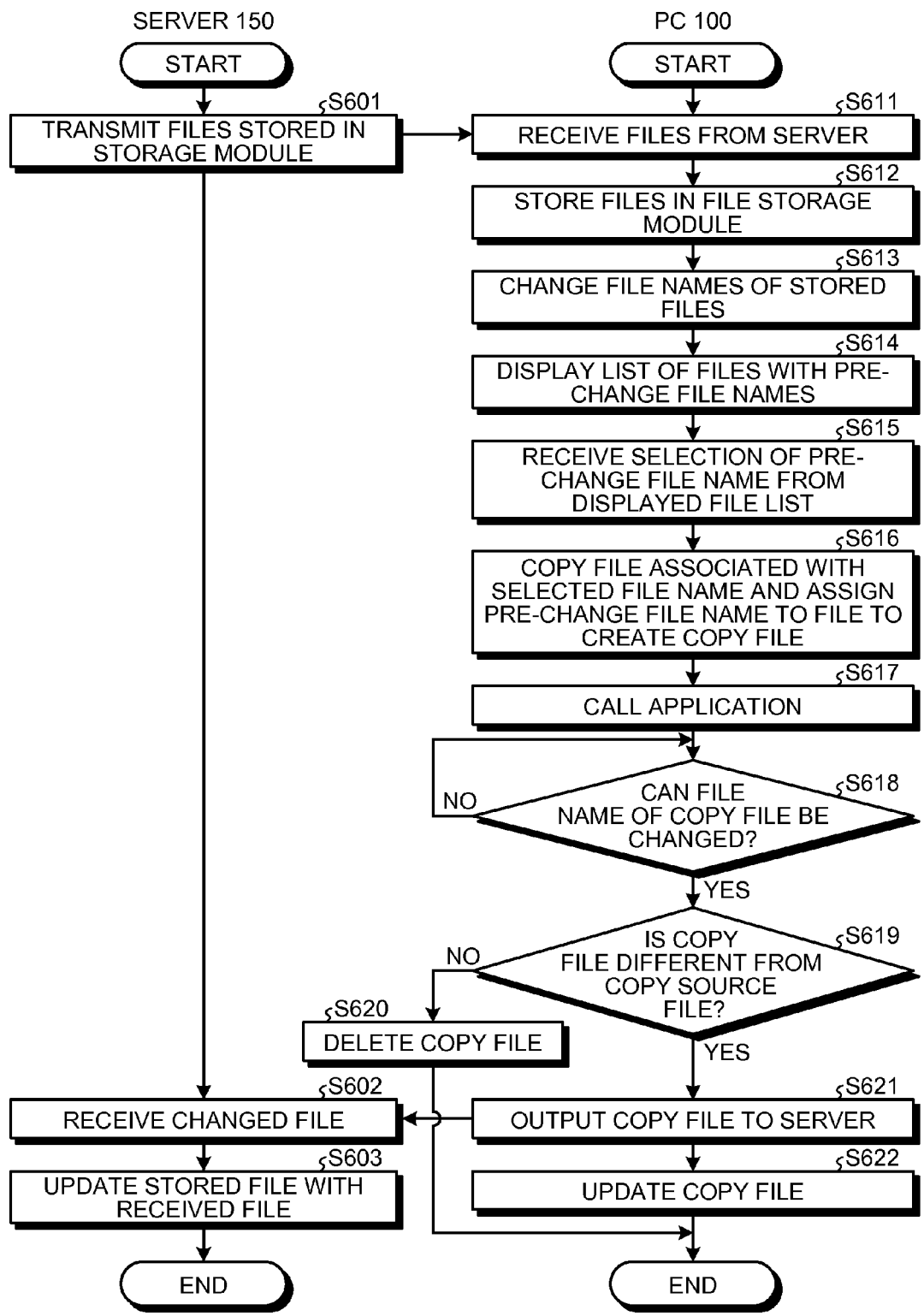
FIG. 6 is an exemplary flowchart of a matching process performed in the file management system when a file is updated in the embodiment.

In the following, a description will be given of a matching process performed for an updated file in the file management system. FIG. 6 is a flowchart of the matching process performed in the file management system.

First, when connected to the PC 100, the communication module 152 of the server 150 reads all files that can be used on the PC 100 from the storage module 151 and transmits them to the PC 100 (S601).

The communication module 103 of the PC 100 receives all the files that can be used on the PC 100 from the server 150 (S611). The acquisition module 111 acquires all the files received by the communication module 103, and stores them in the file storage module 101 (S612).

The change module 112 changes the original file names (pre-change file names) of all the files stored in the file storage module 101 to automatically and uniquely assigned post-change file names, respectively (S613).

In response to a display request from the user, the display module 113 displays a list of files having the pre-change file names on the file selection screen (S614). The receiver 114 receives a selection of a pre-change file name from the file list displayed on the file selection screen (S615).

The creator 115 copies a file associated with the selected file name in the association storage module 102. The creator 115 then assigns the pre-change file name to the file to create a copy file (S616).

The call module 116 calls the application 104 associated with the extension of the copy file, and feeds the copy file to the application 104 (S617).

The file name determination module 117 determines whether the file name of the copy file fed to the first application can be changed at regular intervals (S618). Having determined that the file name cannot be changed (No at S618), the file name determination module 117 checks again whether the file name can be changed after elapse of a predetermined time.

On the other hand, when the file name determination module 117 determines that the file name can be changed (Yes at S618), the file determination module 118 determines whether the copy file is different from the copy source file (S619). Having determined that there is no difference between the files (No at S619), the file determination module 118 deletes the copy file (S620). Then, the process ends.

On the other hand, when the file determination module 118 determines that the copy file is different from the copy source file (Yes at S619), the output module 119 outputs the copy file to the server 150 via the communication module 103 (S621). After assigning a post-change file name to the changed copy file, the output module 119 updates the file stored in the file storage module 101 (S622). With this, the updated file is assigned a file name that the user cannot recognize, and is to be managed by the file management application 110.

The communication module 152 of the server 150 receives the changed file from the PC 100 (S602). The update module 153 updates the storage module 151 with the received file (S603).

As described above, according to the embodiment, the PC 100 can update a file the master of which is managed by the server 150. Moreover, the communication load with the server 150 can be reduced. Thus, the processing load of the PC 100 upon uploading can be reduced.

According to the embodiment, the file management application 110 is capable of determining whether a file is being edited by another application with a simple control of changing the file name. Further, by changing the file name of a file acquired from the server 150, the file is prevented from being edited outside the control of the file management application 110.

Besides, the PC 100 stores all files to be used in the file storage module 101, thereby improving the response when the user opens a file. This also enables various operations such as the preview of a file and improves the response to such an operation.

According to the embodiment, by detecting a change in a file in a manner as described above, the PC 100 can detect the change of a file and manage files with high accuracy while reducing the load on the system including a network.

While a file in the server 150 is described above as being matched to a file edited by the PC 100, a file may be updated not only in the server 150 but also in any device connected to the PC 100. A modification of the embodiment will be described in which a file in a hard disk connected to the PC 100 is matched to a file edited by the PC 100. In the modification, the hard disk may be connected in any way to the PC 100. For example, the hard disk is connected to the PC 100 via a universal serial bus (USB).

The file management application 110 fetches a file stored in the hard disk externally connected to the PC 100, and stores it in the file storage module 101. The PC 100 then performs the same control as previously described in the above embodiment. With this, the file in the hard disk is matched to the file in the PC 100. Accordingly, even if failure occurs to the built-in hard disk of the PC 100 or the external hard disk, data loss can be avoided. This improves the security. Further, the same control as in the above embodiment reduces the number of times to write to the hard disk. Thus, the security of the hard disk is improved, and the processing load is reduced.

Figure 7:
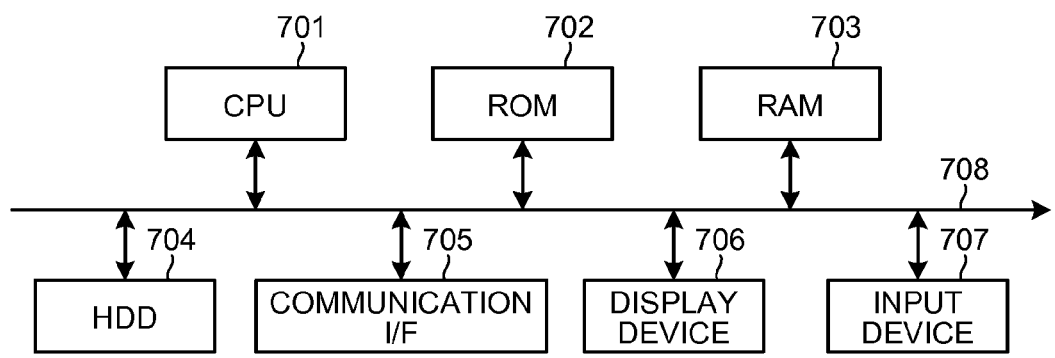
FIG. 7 is an exemplary block diagram of a hardware configuration of a personal computer.

FIG. 7 illustrates a hardware configuration of the PC 100. The PC 100 of the embodiment and the modification thereof comprises a central processing unit (CPU) 701, a read only memory (ROM) 702, a random access memory (RAM) 703, an HDD 704, a communication interface (I/F) 705, a display device 706, and an input device 707 such as a keyboard and a mouse, which are connected by a bus 708. That is, the PC 100 has a common hardware configuration using a computer.

The file management application of the above embodiment and the modification executed on the PC 100 may be provided as being stored in a computer-readable storage medium, such as a compact disc-read only memory (CD-ROM), a flexible disk (FD), a compact disc recordable (CD-R), and a digital versatile disc (DVD), as a file in an installable or executable format.

The file management application may be stored in a computer connected via a network such as the Internet so that it can be downloaded therefrom via the network. The file management application may also be provide or distributed via a network such as the Internet.

The file management application may be provided as being stored in advance in ROM or the like.

The file management application comprises modules that implement the above constituent elements (the acquisition module 111, the change module 112, the display module 113, the receiver 114, the creator 115, the call module 116, the file name determination module 117, the file determination module 118, and the output module 119). As real hardware, the CPU loads the file management application from the storage medium as described above into the RAM 703 and executes it. With this, the acquisition module 111, the change module 112, the display module 113, the receiver 114, the creator 115, the call module 116, the file name determination module 117, the file determination module 118, and the output module 119 are implemented on the RAM 703.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A file processing apparatus comprising:
   an acquisition module configured to acquire a first file from a storage device connected via a network;
   a change module configured to change a first file name of the first file to a second file name that is automatically created regardless of the first file name;
   an association storage configured to store the first file name and the second file name in association with each other;
   a receiver configured to receive a selection of the first file name;
   a creator configured to copy the first file, specified by reference to the first file name selected through the receiver and the association storage, and to thereby create a second file having the first file name;
   a call module configured to call an application and to feed the application with the second file, wherein the application is capable of editing the second file;
   a determination module configured to determine whether the file name of the second file opened by the application can be changed;
   a file determination module configured to, when the file name can be changed, determine whether there is a difference between the first file and the second file; and
   an output configured to, when there is a difference between the first file and the second file, output the second file to the storage device connected via the network.

2. The file processing apparatus of claim 1, wherein the output is configured to, when there is a difference between the first file and the second file, update the first file assigned the second file name with the second file.

3. A non-transitory computer program product comprising a computer-readable storage medium comprising computer readable program codes that, when executed, cause a computer to:
   acquire a first file from a storage device connected via a network;
   change a first file name of the first file to a second file name that is automatically created regardless of the first file name;
   store the first file name and the second file name in association with each other;
   receive a selection of the first file name;
   copy the first file, specified by reference to the first file name selected through the receiver and the association storage, thereby creating a second file assigned the first file name;
   call an application capable of editing the second file;
   feed the application with the second file;
   determine whether the file name of the second file opened by the application can be changed;
   determine, when the file name can be changed, whether there is a difference between the first file and the second file; and
   output the second file to the storage device connected via the network when there is a difference between the first file and the second file.

4. The computer program product of claim 3, further comprising computer readable program codes that, when executed, cause a computer to update the first file assigned the second file name with the second file, when there is a difference between the first file and the second file.

5. A file processing method applied to a file processing apparatus, the file processing method comprising:
   acquiring a first file from a storage device connected via a network by an acquisition module;
   changing, by a change module, a first file name of the first file to a second file name that is automatically created regardless of the first file name;
   storing the first file name and the second file name in association with each other in an association storage;
   receiving a selection of the first file name by a receiver;
   copying the first file, specified by reference to the first file name selected at the receiving and the association storage, thereby creating a second file assigned the first file name by a creator;
   calling, on one or more processors, an application capable of editing the second file and feeding the application with the second file by a call module;
   determining, by a determination module, whether the file name of the second file opened by the application can be changed;
   determining, when the file name can be changed, whether there is a difference between the first file and the second file by a file determination module; and
   outputting, when there is a difference between the first file and the second file, the second file to the storage device connected via the network by an output.

* * * * *